United States Patent
Gerges et al.

(10) Patent No.: US 12,139,883 B2
(45) Date of Patent: Nov. 12, 2024

(54) LADDER MOTOR PUMP SYSTEM

(71) Applicant: Caterpillar Inc., Peoria, IL (US)

(72) Inventors: Raymond Bassili Gerges, New Lenox, IL (US); Michael Thomas Jackson, Hanna City, IL (US)

(73) Assignee: Caterpillar Inc., Peoria, IL (US)

( * ) Notice: Subject to any disclaimer, the term of this patent is extended or adjusted under 35 U.S.C. 154(b) by 258 days.

(21) Appl. No.: 17/733,832

(22) Filed: Apr. 29, 2022

(65) Prior Publication Data

US 2023/0349128 A1    Nov. 2, 2023

(51) Int. Cl.
*B60R 3/02*    (2006.01)
*E02F 9/08*    (2006.01)

(52) U.S. Cl.
CPC ............. *E02F 9/0833* (2013.01); *B60R 3/02* (2013.01); *B60Y 2200/412* (2013.01)

(58) Field of Classification Search
CPC ..... E02F 9/0833; B60R 3/02; B60Y 2200/412
See application file for complete search history.

(56) References Cited

U.S. PATENT DOCUMENTS

| | | | |
|---|---|---|---|
| 7,265,954 B2 | 9/2007 | Hikawa et al. | |
| 7,540,685 B2 * | 6/2009 | Avikainen | B62D 33/0636 180/327 |
| 8,622,173 B2 * | 1/2014 | Fuqua | B60R 3/005 182/64.1 |
| 10,005,397 B2 * | 6/2018 | Uemura | E02F 9/16 |
| 10,099,623 B2 * | 10/2018 | Hamaguchi | E02F 9/0833 |
| 10,267,122 B2 * | 4/2019 | Toma | E21B 41/00 |
| 10,392,777 B2 * | 8/2019 | Hamaguchi | E02F 9/0833 |
| 10,858,893 B2 * | 12/2020 | Toma | E21B 41/00 |

(Continued)

FOREIGN PATENT DOCUMENTS

| | | |
|---|---|---|
| CN | 206383889 U | 8/2017 |
| CN | 214045011 U | 8/2021 |

(Continued)

OTHER PUBLICATIONS

Written Opinion and International Search Report for Int'l. Patent Appln. No.PCT/US2023/018238, mailed Jul. 4, 2023 (11 pgs).

*Primary Examiner* — Jacob B Meyer
(74) *Attorney, Agent, or Firm* — Lee & Hayes, P.C.

(57) ABSTRACT

A ladder motor pump system comprises a hydraulic fluid tank that holds hydraulic fluid, a hydraulic pump that draws and pressurizes the hydraulic fluid from the hydraulic fluid tank, a one-way electric motor that drives the hydraulic pump, a hydraulic ladder actuator that actuates a ladder in first and second patterns, a hydraulic fluid circuit that routes the hydraulic fluid from the hydraulic ladder actuator to the hydraulic fluid tank, and a regulator that routes the pressurized hydraulic fluid from an outlet of the hydraulic pump to the hydraulic fluid tank when a pressure of the pressurized hydraulic fluid exceeds a preselected threshold pressure, mixing the pressurized hydraulic fluid with the unpressurized hydraulic fluid in the hydraulic fluid tank and reducing temperature of the pressurized hydraulic fluid. The electric motor and the pump include bosses providing increased ground connections to the electrical ground, thereby reducing electrical resistance and heat generated.

20 Claims, 4 Drawing Sheets

(56) References Cited

U.S. PATENT DOCUMENTS

| | | | |
|---|---|---|---|
| 10,988,938 B2 * | 4/2021 | Wearmouth | E04F 11/0255 |
| 2009/0301813 A1 * | 12/2009 | Chantelois | E06C 5/10 |
| | | | 182/64.1 |
| 2021/0328539 A1 | 10/2021 | Matsuda et al. | |
| 2022/0388450 A1 * | 12/2022 | Varao | B60R 3/02 |
| 2023/0349128 A1 * | 11/2023 | Gerges | E06C 5/10 |
| 2023/0366178 A1 * | 11/2023 | Saitoh | E02F 9/16 |

FOREIGN PATENT DOCUMENTS

| | | | | |
|---|---|---|---|---|
| JP | 07277079 A | | 10/1995 | |
| JP | 2005083033 A | * | 3/2005 | E02F 9/0833 |
| JP | 2006161317 A | * | 6/2006 | E02F 9/0833 |
| WO | WO2012139294 A1 | | 10/2012 | |

* cited by examiner

LADDER MOTOR PUMP SYSTEM

TECHNICAL FIELD

The present disclosure relates to a system and method for preventing overheating of a ladder motor pump system, and more particularly, to a system and method for safely cooling high pressure and high temperature hydraulic fluid, and providing sufficient electrical ground for a hydraulic pump and an electric motor driving the hydraulic pump.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. Some of these machines are large and an operator of such a machine is not able to simply step into the cab of the machine from the outside at the ground level. To assist the operator with accessing the cab of the machine, some of these large machines, such as large track type tractors (LTTTs), are equipped with an electrically and/or hydraulically driven access ladder, which is normally stored away to a side of the machine and swings out, or extends, from the stored position to the ground level to assist the operator entering or exiting the cab.

To operate the ladder, an electric motor drives a hydraulic pump to pressurize the hydraulic fluid, which generates heat. Excess heat may cause the electric motor and/or the hydraulic pump to fail or become fire safety hazard. For example, the electric motor may become overheated if it is overused, overdraws current, or has an insufficient electrical path to the ground. The hydraulic pump and the hydraulic fluid may also become overheated when the hydraulic pump is overused.

JP Patent Publication No. 07277079A by Hosokawa, et al. ("the '079 publication"), published Oct. 24, 1995, describes a step device provided at a loading and unloading port of the cab-over-the-engine vehicle that is operated with a step displacement hydraulic circuit for displacing the step to a position convenient for loading and unloading and a position convenient while traveling. Specifically, the '079 publication describes that an electric motor drives a hydraulic pump, pressurized oil for raising and lowering the step is returned to a holding tank by switching various valves, and when the electric motor become overheated and exceeds a prescribed temperature, the power to the electric motor is cut off with a thermal relay. Although the '079 publication describes returning the pressurized oil to the holding tank, the system described in the '079 publication is not configured to optimize operation of the one or more machine components utilized for raising and lowering the disclosed ladder. As a result, over time, such components may require frequent repairs which can be costly and time-consuming. Additionally, due to overheating, burnout, and other wear-related issues associated with the component configurations described in the '079 publication, such components may suffer from premature failure.

The systems and methods described herein are directed to addressing one or more of the drawbacks set forth above.

SUMMARY

According to a first aspect, a system may include a hydraulic fluid tank configured to hold hydraulic fluid, a hydraulic pump fluidly connected to the hydraulic fluid tank and configured to draw and pressurize the hydraulic fluid from the hydraulic fluid tank, an electric motor coupled to the hydraulic pump and configured to drive the hydraulic pump to pressurize the hydraulic fluid, and a hydraulic fluid circuit fluidly connected to the hydraulic pump and the hydraulic fluid tank and configured to route the pressurized hydraulic fluid to the hydraulic fluid tank, mix the pressurized hydraulic fluid with unpressurized hydraulic fluid in the hydraulic fluid tank, and reduce the temperature of the pressurized hydraulic fluid.

According to another aspect a system may include a hydraulic fluid tank configured to hold hydraulic fluid, a hydraulic pump fluidly connected to the hydraulic fluid tank and configured to draw and pressurize the hydraulic fluid from the hydraulic fluid tank, an electric motor coupled to the hydraulic pump and configured to drive the hydraulic pump to pressurize the hydraulic fluid, a regulator fluidly connected to the hydraulic pump at an outlet of the hydraulic pump, and a hydraulic fluid circuit fluidly coupled to the hydraulic pump, the regulator, and the hydraulic fluid tank, wherein the regulator is configured to route the pressurized hydraulic fluid from the outlet to the hydraulic fluid tank via the hydraulic fluid circuit when a pressure of the pressurized hydraulic fluid at the outlet exceeds a preselected threshold pressure, mix the pressurized hydraulic fluid with the unpressurized hydraulic fluid in the hydraulic fluid tank, and reduce the temperature of the pressurized hydraulic fluid.

According to yet another aspect, a system may include a hydraulic fluid tank configured to hold hydraulic fluid, a hydraulic pump fluidly connected to the hydraulic fluid tank and configured to draw and pressurize the hydraulic fluid from the hydraulic fluid tank, an electric motor coupled to the hydraulic pump and configured to drive the hydraulic pump to pressurize the hydraulic fluid, and a hydraulic fluid circuit fluidly connected to the hydraulic pump and the hydraulic fluid tank and configured to route the pressurized hydraulic fluid to the hydraulic fluid tank, mix the pressurized hydraulic fluid with unpressurized hydraulic fluid in the hydraulic fluid tank, and reduce the temperature of the pressurized hydraulic fluid, wherein the electric motor includes a thermal switch configured to cut off power to the electric motor when internal temperature of the electric motor exceeds a preselected threshold temperature.

According to yet another aspect, a system may include a hydraulic fluid tank configured to hold hydraulic fluid, a hydraulic pump fluidly connected to the hydraulic fluid tank and configured to draw and pressurize the hydraulic fluid from the hydraulic fluid tank, an electric motor coupled to the hydraulic pump and configured to drive the hydraulic pump to pressurize the hydraulic fluid, and a hydraulic fluid circuit fluidly connected to the hydraulic pump and the hydraulic fluid tank, wherein a motor housing of the electric motor and a pump housing of the hydraulic pump each have one or more bosses connected to an electrical ground by one or more conductors.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for preventing overheating of a ladder motor pump system by safely cooling high pressure and high temperature hydraulic fluid and providing sufficient electrical ground for a hydraulic pump and an electric motor driving the hydraulic pump. As will be described below, in some examples, hydraulic fluid from a hydraulic fluid tank may be pressurized by a hydraulic pump, which is driven by an electric motor. The pressurized hydraulic fluid may be routed from the hydraulic pump to an actuator, such as a hydraulic actuator, for example, to move a ladder of a large track type tractor such as a large bulldozer. The pressurized hydraulic fluid may be routed from the hydraulic actuator to the hydraulic fluid tank to be mixed with unpressurized hydraulic fluid for cooling. In some examples, the pressurized hydraulic fluid from an outlet of the hydraulic pump may be routed to the hydraulic fluid tank when a pressure of the pressurized hydraulic fluid exceeds a preselected threshold pressure, and be mixed with the unpressurized hydraulic fluid in the hydraulic fluid tank for cooling.

Figure 1:
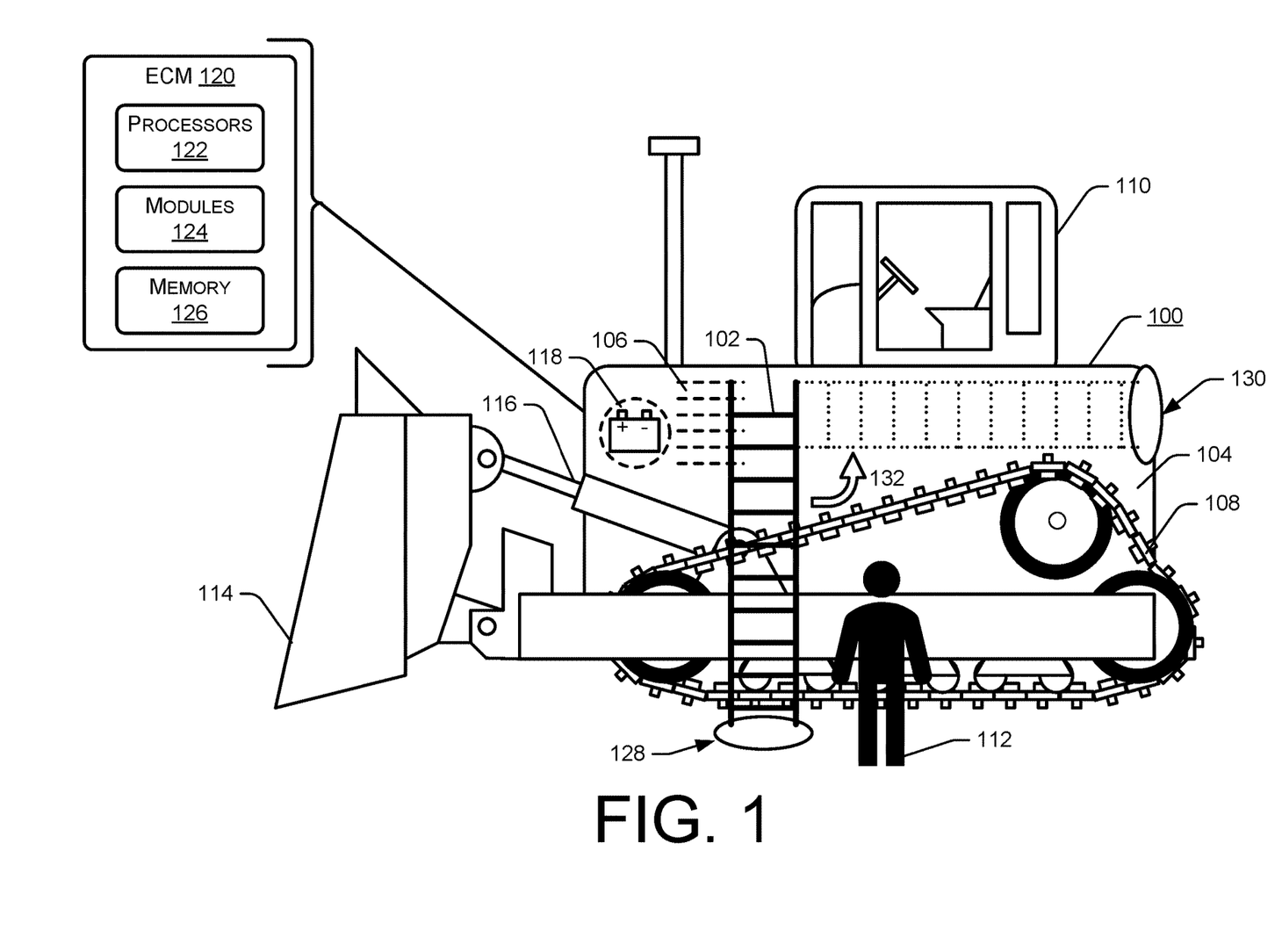
FIG. 1 illustrates a diagram depicting a schematic side view of an example large track type tractor (LTTT) with a ladder actuated by a ladder motor pump system.

FIG. 1 is a diagram depicting a schematic side view of an example large track type tractor (LTTT) 100 with a ladder 102 actuated by a ladder motor pump system (not shown). The example LTTT 100 shown in FIG. 1 is a bulldozer. However, the LTTT 100, which may also be referred to as a machine 100, may be any type of machine, large enough to benefit from a use of a ladder, configured to travel across terrain, such as an automobile, a truck, an agricultural vehicle, and/or work vehicles, such as a wheel loader, a track loader, a skid-steer loader, a grader, an on-highway truck, an off-highway truck, and/or any other machine known to a person skilled in the art.

The machine 100 includes a chassis or frame 104 to which a power source (e.g., an engine 106) is attached. The engine 106 is configured to supply power for operation of the machine 100, including, for example, operating work implements, electronics, and steering, and/or for supplying torque to drive members to propel the machine 100 across the terrain. For example, the machine 100 shown in FIG. 1 includes a pair of tracks 108 (only one set of tracks shown) that are configured to propel the machine 100 across pavement, gravel, dirt, or other work surfaces. Although the machine 100 includes tracks 108, it is contemplated that the machine 100 may include one or more wheels instead of, or in addition to, the tracks. The machine 100 also includes a cab 110 operationally connected to the frame 104 for protecting and/or providing comfort for an operator 112 of the machine 100, and/or for protecting control-related devices of the machine 100. In some examples, the machine 100 may be semi-autonomous or fully autonomous, and able to operate without an onboard or remote operator.

In the example shown in FIG. 1, the machine 100 also includes a work implement 114 for performing operations associated with the machine 100, such as digging, carrying, raising, and/or depositing material. The machine 100 includes a work implement actuator 116 coupled at one end to the frame 104 and/or to the proximal end of the work implement 114. The work implement actuator 116 is configured to extend and retract, thereby pivoting the work implement 114 between an upright orientation and an at least partially inverted orientation, for example. In the upright orientation, the work implement 114 may hold material and in the at least partially inverted orientation, the work implement 114 may deposit or dump the material. Other forms of work implements are contemplated. For example, although the work implement 114 in FIG. 1 is illustrated as a shovel, the work implement 114 may include augers, brushcutters, brooms, grapples, hammers, pulverizers, rippers, rotors, and so forth.

The machine 100 may include a battery 118 to power various electrical equipment in the machine 100. For example, the machine 100 may include an electronic control module (ECM) 120 that houses one or more processors 122, which may execute any modules, components, or systems associated with the machine 100, some of which may be housed in the ECM 120 as shown as modules 124. In some examples, the processors 122 may include a central processing unit (CPU), a graphics processing unit (GPU), both CPU and GPU, or other processing units or components known in the art. Additionally, each of the processors 122 may possess its own local memory, which also may store program modules, program data, and/or one or more operating systems.

Computer-readable media, such as memory 126, associated with the machine 100 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the machine 100. In some examples, one or more of the modules may include or be associated with computer-executable instructions that are stored by the computer-readable media and that are executable by one or more processors to perform such operations.

As illustrated in FIG. 1, the machine 100 includes the ladder 102, shown in an extended position 128 where the operator 112 can climb up to the cab 110. In this example, the ladder 102 is configured to swing up to the side of the machine 100 to be in a stored position 130, shown by an arrow 132 and the ladder 102 in dotted lines. In other examples, the ladder 102 may pivot and swing up, or simply extend and retract.

As discussed above, a machine, such as the machine 100, is used to perform variety of tasks at a worksite and requires an operator, such as the operator 112, to operate the machine 100 to perform the tasks. Due to the size of the machine 100, the operator 112 is not able to simply step in and out of the cab 110. To assist the operator 112 getting in and out of the cab 110, a hydraulically operated ladder, such as the ladder 102 actuated by a ladder motor pump system, that can change position from the storage position 130 when not in use to the extended position 128 to assist the operator 112 getting in and out of the cab 110.

Figure 2:
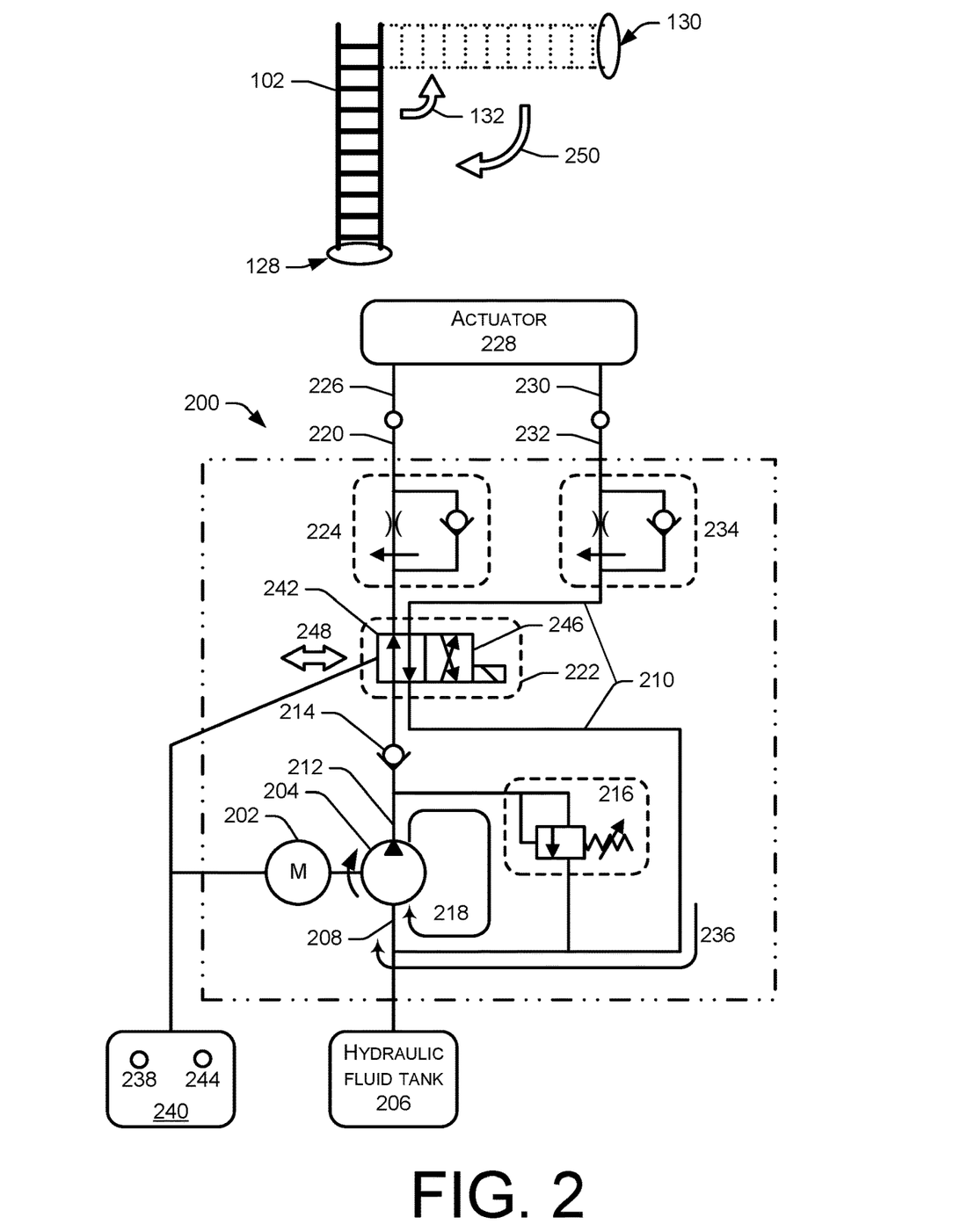
FIG. 2 illustrates a schematic illustration of a closed loop ladder motor pump system.

FIG. 2 is a block diagram of a closed loop ladder motor pump system 200. The closed loop ladder motor pump system 200 comprises an electric motor 202, which may be powered by a power source of the machine 100, such as the battery 118, and drives a hydraulic pump 204 to pressurize hydraulic fluid from a hydraulic fluid tank 206. An inlet 208 of the hydraulic pump 204 is connected to the hydraulic fluid tank 206 to draw the hydraulic fluid to be pressurized for use. Hydraulic fluid lines/connections among various components in the closed loop ladder motor pump system 200 are referred to as a hydraulic fluid circuit 210. An outlet 212 of the hydraulic pump 204 is connected to a check valve 214 and a regulator 216. The regulator 216 may monitor pressure of the pressurized hydraulic fluid at the outlet 212 and/or be configured to route the pressurized hydraulic fluid back to the inlet 208 via the hydraulic fluid circuit 210 as indicated by an arrow 218 when the pressure of the pressurized hydraulic fluid exceeds a preselected threshold pressure, for example, 3000 psi. Below the preselected threshold pressure, the pressurized hydraulic fluid from the hydraulic pump 204 is routed to a first port 220 of the closed loop ladder motor pump system 200 through the hydraulic fluid circuit 210 via a flow switch 222 and a first valve 224. The first port 220 is connected to a port A 226 of a hydraulic actuator 228 thus routing the pressurized hydraulic fluid to actuate, move, or orient, a ladder, such as the ladder 102 in a first pattern, for example, from the extended position 128 to the stored position 130 indicated by the arrow 132 as described in FIG. 1 and also shown in FIG. 2. The pressurized hydraulic fluid entering from the port A 226 to move the ladder 102 in the first pattern is output from a port B 230 of the hydraulic actuator 228 connected to a second port 232 of the closed loop ladder motor pump system 200, and routed back to the inlet 208 of the hydraulic pump 204 through a second valve 234 and the flow switch 222 via the hydraulic fluid circuit 210 as indicated by an arrow 236. Each of the first valve 224 and the second valve 234 may include a variable orifice that may be manually or electrically adjustable to control the speed of the ladder 102 being raised or lowered. The flow pattern and the ladder 102 movement described above may be initiated when the operator 112 activates a first switch 238 of a switch panel 240, which turns on the electric motor 202 and positions the flow switch a first position 242 as shown in FIG. 2. The electric motor 202 may be automatically turned off upon detecting the ladder reaching the stored position 130 and/or upon reaching a predetermined time limit.

The circulation/flow pattern of the pressurized hydraulic fluid in the hydraulic actuator 228 can be reversed in response to an activation of a second switch 244 of the switch panel 240. In response, the flow switch 222 is positioned to a second position 246, as indicated by a double ended arrow 248, such that the pressurized hydraulic fluid enters the hydraulic actuator 228 from the port B 230 via the second valve 234 and leaves the hydraulic actuator 228 from the port A 226 through the first valve 224, and the pressurized hydraulic fluid is again routed back to the inlet 208 of the hydraulic pump 204 through the flow switch 222, in the second position 246, via the hydraulic fluid circuit 210. This reverse flow of the pressurized hydraulic fluid reverses the actuation of the ladder 102 to move in a second pattern, for example, from the stored position 130 to the extended position 128 as indicated by an arrow 250.

Figure 3:
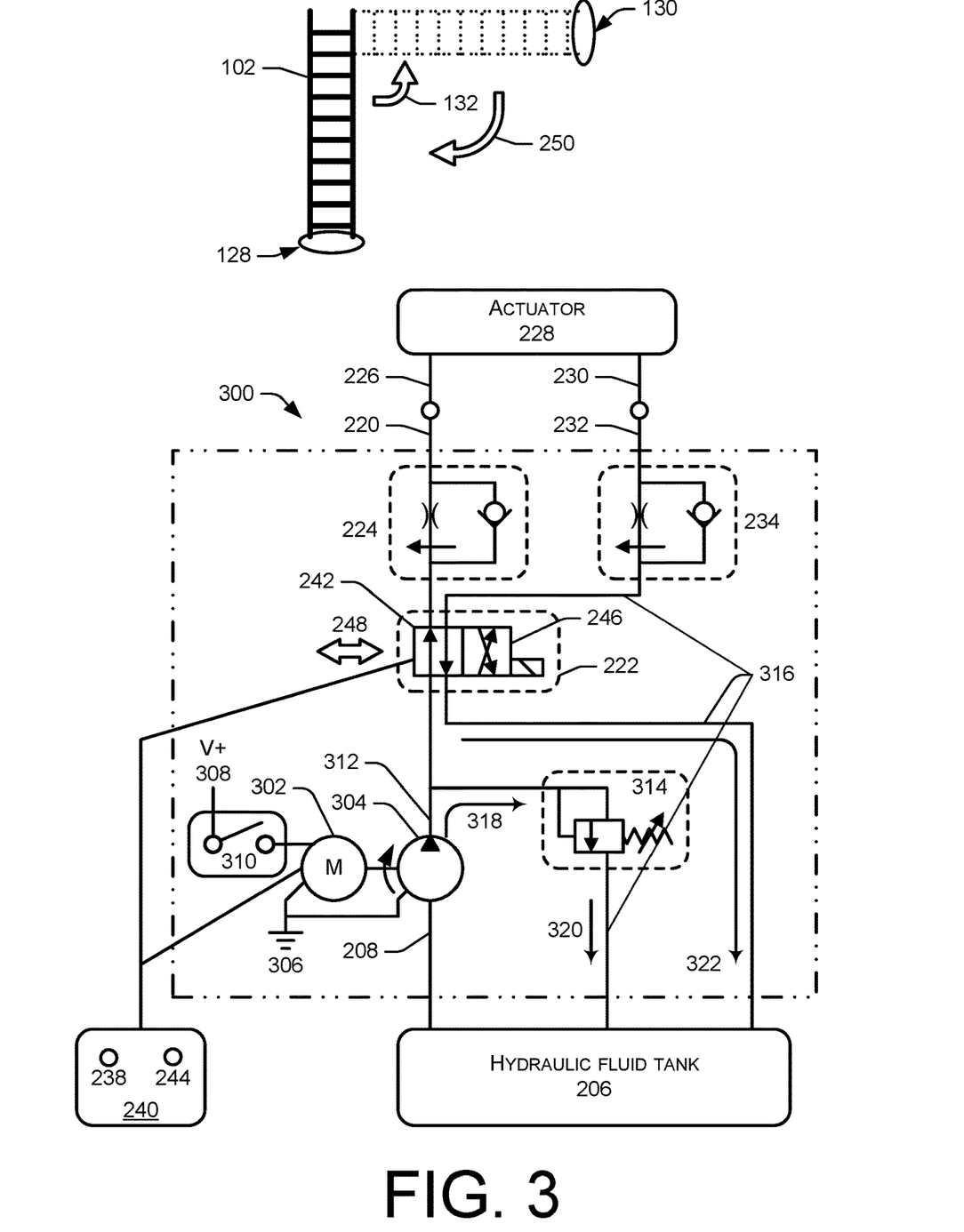
FIG. 3 illustrates a schematic illustration of a ladder motor pump system with an additional pressurized hydraulic fluid temperature reduction mechanism.

To further reduce the temperature of the pressurized hydraulic fluid, in addition to routing the pressurized hydraulic fluid from the hydraulic actuator 228 to the hydraulic fluid tank 206, the pressurized hydraulic fluid from the outlet 212 of the hydraulic pump 204, when the pressure of the pressurized hydraulic fluid exceeds a preselected threshold pressure, may also be routed to the hydraulic fluid tank 206. FIG. 3 is a schematic illustration of a ladder motor pump system 300 with an additional pressurized hydraulic fluid temperature reduction mechanism. The ladder motor pump system 300 includes components similar to those discussed above with reference to the closed loop ladder motor pump system 200 in FIG. 2, and only those components different from those previously described with reference to FIG. 2 will be further described with reference to FIG. 3. For instance, the example ladder motor pump system 300 shown in FIG. 3 includes an electric motor 302, which may be a one-way, or a unidirectional, motor and drive a hydraulic pump 304 to pressurize hydraulic fluid. However, the electric motor 302 is additionally designed to meet a certain industry standard, such as the IP67. Additionally, the electric motor 302, more specifically, a housing of the electric motor 302 includes one or more bosses (motor bosses) connected to an electrical ground 306, such as the frame 104 of the machine 100 to which the ladder 102 is attached, by one or more conductors instead of relying on a mounting bracket (not shown) of the electric motor 302 to the frame 104 to provide a grounding connection. These bosses and conductors connecting the frame 104 provides increased ground connections to the electrical ground 306, thereby reducing resistance in a return current path and reducing heat generated. Additionally, the electric motor 302 is connected to a supply voltage V+ 308 through a thermal switch 310 which is configured to cut off the supplied power, for example, from the battery 118, to the electric motor 302 when internal temperature of the electric motor 302 exceeds a preselected threshold temperature, thereby by preventing the electric motor 302 from burning out. The hydraulic pump 304, more specifically, a housing of the hydraulic pump 304, also includes one or more bosses (pump bosses) connected to the electrical ground 306 to provide additional electrical return paths and further reduce the heat generated in the return current path.

As described above with reference to FIG. 2, the inlet 208 of the hydraulic pump 304 is connected to the hydraulic fluid tank 206 to draw the hydraulic fluid to be pressurized for use. An outlet 312 of the hydraulic pump 304 is connected to a regulator 314. However, in this example, pressurized hydraulic fluid from the outlet 312 is routed back to the hydraulic fluid tank 206 via the regulator 314 and a hydraulic fluid circuit 316, as indicated by arrows 318 and 320 when a pressure of the pressurized hydraulic fluid exceeds a preselected threshold pressure, for example, 3000 psi. The regulator 314 may be a variable regulator capable of vary, or set, the preselected threshold pressure to different pressures. In the hydraulic fluid tank 206, the pressurized (thus high in temperate) hydraulic fluid is mixed with unpressurized hydraulic fluid and cooled. Below the preselected threshold pressure, the pressurized hydraulic fluid from the hydraulic pump 304 is routed to the first port 220 as described above with reference to FIG. 2. The pressurized hydraulic fluid from the hydraulic actuator 228 is also returned to the hydraulic fluid tank 206 via the flow switch 222 and the hydraulic fluid circuit 316, as indicated by arrows 322.

By mixing the pressurized hydraulic fluid and/or the over-pressurized hydraulic fluid, which are high in temperature due to being pressurized and used to move the ladder 102, with unpressurized hydraulic fluid in the hydraulic fluid tank 206 acting as a thermal reservoir, the temperature of the hydraulic fluid in the ladder motor pump system 300 is lowered further compared to that of the closed loop ladder motor pump system 200. By lowering the temperature of the hydraulic fluid used in the ladder motor pump system 300, thermal stress on the components in the ladder motor pump system 300 is reduced and the failure rate of the components, such as the electric motor 302 and the hydraulic pump 304, due to heat is reduced. Additionally, by providing the thermal switch 310 to the electric motor 302, electricity powering the electric motor 302 can be cut off when internal temperature of the electric motor 302 exceeds a preselected threshold temperature, due to shorts, overuse, etc., thereby by preventing the electric motor 302 from burning out.

Figure 4:
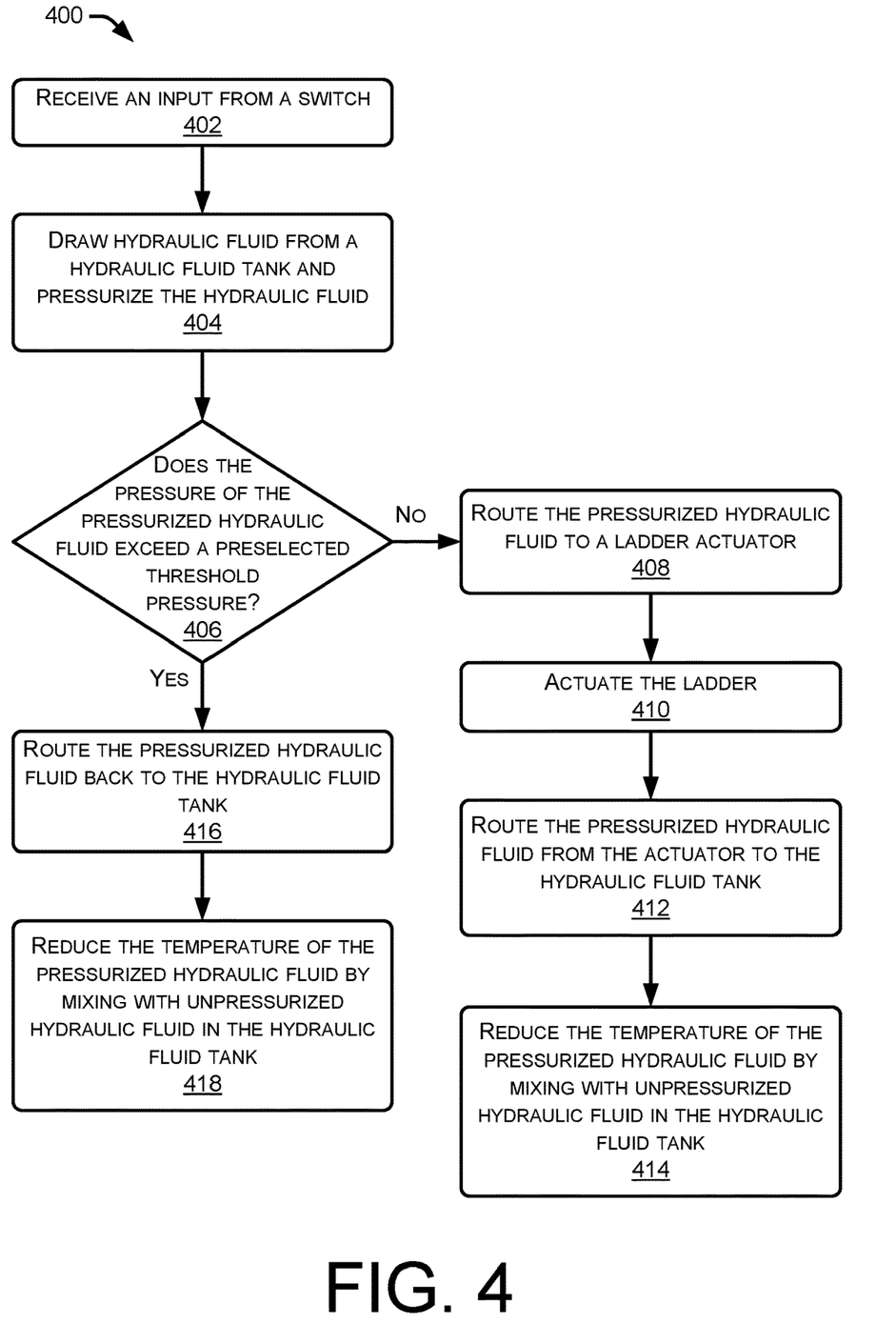
FIG. 4 provides a flow chart representing an example detail process cooling high pressure and high temperature hydraulic fluid.

FIG. 4 provides a flow chart representing an example detail process cooling high pressure and high temperature hydraulic fluid. The process 400 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

At block 402, an electric motor, such as the electric motor 302 as described above with reference to FIG. 3, receives an input from an electrical switch, such as a switch form the switch panel 240. A hydraulic pump, such as the hydraulic pump 304 driven by the electric motor 302 as described above with reference to FIG. 3, draws hydraulic fluid from a hydraulic fluid tank, such as the hydraulic fluid tank 206, and pressurizes the hydraulic fluid at block 404. At block 406, whether the pressure of the pressurized hydraulic fluid exceeds a preselected threshold pressure, such as 3000 psi, is determined. A regulator, such as the regulator 314, may be utilized and a routing path of the pressurized hydraulic fluid may be determined based on the pressure. If the pressure is determined not to exceed the preselected threshold pressure ("No" branch), at block 408, the pressurized hydraulic fluid is routed to a hydraulic ladder actuator, such as the hydraulic actuator 228, for example, by the regulator 314 and the flow switch 222 as described above with reference to FIG. 3. At block 410, the ladder is actuated, that is, the ladder 102 is moved from the extended position 128 to the stored position 130, or vice versa, as discussed above with reference to FIGS. 1-3. After the pressurized hydraulic fluid is used by the hydraulic actuator 228 to move the ladder 102, the pressurized hydraulic fluid from the hydraulic actuator 228 is routed to the hydraulic fluid tank 206 at block 412, via the flow switch 222. The pressurized hydraulic fluid is mixed with unpressurized hydraulic fluid in the hydraulic fluid tank 206 and the temperature of the pressurized hydraulic fluid is reduced at block 414. If the pressure is determined to exceed the preselected threshold pressure ("Yes" branch) at block 406, the pressurized hydraulic fluid is routed back the hydraulic fluid tank 206 via the regulator 314 at block 416. The pressurized hydraulic fluid may be mixed with unpressurized hydraulic fluid in the hydraulic fluid tank 206 and the temperature of the pressurized hydraulic fluid is reduced at block 418.

INDUSTRIAL APPLICABILITY

The example systems and methods of the present disclosure are applicable to a variety of large machines, such as, for example, an automobile, marine vehicles, a truck, an agricultural vehicle, a paving machine, a mining machine, and/or construction vehicles. The systems and methods described herein may be used in association with a hydraulically operated ladder used for entry and exit from a cab of a large machine. For example, to reduce component failures due to excessive heat from hydraulic fluid used to operate the ladder, temperature of the pressurized hydraulic fluid is reduced by mixing with unpressurized hydraulic fluid, acting as a thermal reservoir, in a hydraulic fluid tank. A hydraulic pump, driven by an electric motor, may draw hydraulic fluid from such a hydraulic fluid tank and pressurize the hydraulic fluid. The pressurized hydraulic fluid may be routed to a hydraulic actuator, such as a ladder actuator, and after actuating the ladder, the pressurized hydraulic fluid from the hydraulic actuator may be routed to the hydraulic fluid tank and be mixed with unpressurized hydraulic fluid in the hydraulic fluid tank, and the temperature of the pressurized hydraulic fluid may be reduced.

For example, when a pressure of the pressurized hydraulic fluid exceeds a preselected threshold pressure, the pressurized hydraulic fluid from an outlet of the hydraulic pump may be routed to the hydraulic fluid tank and be mixed with unpressurized hydraulic fluid in the hydraulic fluid tank, and the temperature of the pressurized hydraulic fluid may be reduced. In some examples, the electric motor described above may also include a thermal switch that cuts off electricity to the electric motor when internal temperature of the electric motor exceeds a preselected threshold temperature. Additionally, in some examples, a motor housing of the electric motor and a pump housing of the hydraulic pump may each have one or more bosses connected to an electrical ground by one or more conductors providing additional electrical return paths and reducing the heat generated in the return current path.

As a result of the configurations noted above and described herein, temperature of pressurized hydraulic fluid circulating the ladder motor pump system is reduced. With the reduced temperature of the pressurized hydraulic fluid, thermal stress on the components utilized with the pressurized hydraulic fluid is reduced and premature failure of the components due to thermal stress is also reduced.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A ladder system configured to be attached to a machine, comprising:
    a hydraulic fluid tank configured to hold hydraulic fluid;
    a hydraulic pump fluidly connected to the hydraulic fluid tank, the hydraulic pump configured to draw hydraulic fluid from the hydraulic fluid tank and pressurize the hydraulic fluid;
    a one-way electric motor coupled to the hydraulic pump, the one-way electric motor having a motor housing that includes one or more motor bosses connected to an electrical ground by one or more conductors, the one-way electric motor configured to drive the hydraulic pump to pressurize the hydraulic fluid;
    an electrical switch coupled to the one-way electric motor, the electrical switch configured to power the one-way electric motor with a power source of the machine;
    a ladder;
    a ladder actuator coupled to the ladder;
    a variable orifice fluidly connected to the ladder actuator, the ladder actuator configured to receive the pressurized hydraulic fluid and actuate the ladder, and the variable orifice configured to control an actuation speed of the ladder as the ladder transitions between a raised position and a lowered position; and
a hydraulic fluid circuit fluidly connected to the hydraulic pump, the ladder actuator, and the hydraulic fluid tank, the hydraulic fluid circuit configured to:
route the pressurized hydraulic fluid from the ladder actuator to the hydraulic fluid tank, and
mix the pressurized hydraulic fluid with unpressurized hydraulic fluid in the hydraulic fluid tank to reduce temperature of the pressurized hydraulic fluid.

2. The ladder system of claim 1, further comprising:
a regulator fluidly connected to the hydraulic pump at an outlet of the hydraulic pump, the regulator configured to:
route the pressurized hydraulic fluid from the outlet to the hydraulic fluid tank via the hydraulic fluid circuit when a pressure of the pressurized hydraulic fluid at the outlet exceeds a preselected threshold pressure, and
mix the pressurized hydraulic fluid with the unpressurized hydraulic fluid in the hydraulic fluid tank to reduce temperature of the pressurized hydraulic fluid.

3. The ladder system of claim 2, wherein the regulator is a variable regulator and is configured to be able to vary the preselected threshold pressure.

4. The ladder system of claim 1, further comprising a flow switch fluidly coupled to the hydraulic pump, the ladder actuator, and the hydraulic fluid tank, the flow switch configured to:
route the pressurized hydraulic fluid from the hydraulic pump to a first port of the ladder actuator to actuate the ladder in a first pattern, and
route the pressurized hydraulic fluid from a second port of the ladder actuator to the hydraulic fluid tank.

5. The ladder system of claim 4, wherein the flow switch is further configured to:
route the pressurized hydraulic fluid from the hydraulic pump to the second port to actuate the ladder in a second pattern, and
route the pressurized hydraulic fluid from the first port to the hydraulic fluid tank.

6. The ladder system of claim 1, wherein the one-way electric motor includes a thermal switch configured to cut off the power from the power source to the one-way electric motor when internal temperature of the one-way electric motor exceeds a preselected threshold temperature.

7. The ladder system of claim 1, wherein the hydraulic pump comprises a pump housing that includes one or more pump bosses connected to the electrical ground by one or more conductors.

8. The ladder system of claim 5, further comprising:
a first valve and a second valve fluidly coupled to the ladder actuator and the flow switch,
the first valve including the variable orifice, and
the second valve including an additional variable orifice configured to control the actuation speed of the ladder.

9. A machine, comprising:
a frame;
a battery supported by the frame;
a hydraulic fluid tank supported by the frame, the hydraulic fluid tank configured to hold hydraulic fluid;
a hydraulic pump supported by the frame, the hydraulic pump fluidly connected to the hydraulic fluid tank, the hydraulic pump configured to draw hydraulic fluid from the hydraulic fluid tank and pressurize the hydraulic fluid;
a one-way electric motor supported by the frame, the one-way electric motor coupled to the hydraulic pump, the one-way electric motor having a motor housing that includes one or more motor bosses connected to the frame for an electrical ground by one or more conductors, the electric one-way motor configured to drive the hydraulic pump to pressurize the hydraulic fluid;
an electrical switch coupled to the one-way electric motor, the electrical switch configured to power the one-way electric motor with the battery;
a ladder supported by the frame;
a ladder actuator supported by the frame, the ladder actuator coupled to the ladder;
a variable orifice fluidly connected to the ladder actuator, the ladder actuator configured to receive the pressurized hydraulic fluid and actuate the ladder, and
the variable orifice configured to control an actuation speed of the ladder as the ladder transitions between a raised position and a lowered position; and
a hydraulic fluid circuit fluidly connected to the hydraulic pump, the ladder actuator, and the hydraulic fluid tank, the hydraulic fluid circuit configured to:
route the pressurized hydraulic fluid from the ladder actuator to the hydraulic fluid tank, and
mix the pressurized hydraulic fluid with unpressurized hydraulic fluid in the hydraulic fluid tank to reduce temperature of the pressurized hydraulic fluid.

10. The machine of claim 9, further comprising:
a regulator fluidly connected to the hydraulic pump at an outlet of the hydraulic pump, the regulator configured to:
route the pressurized hydraulic fluid from the outlet to the hydraulic fluid tank via the hydraulic fluid circuit when a pressure of the pressurized hydraulic fluid at the outlet exceeds a preselected threshold pressure, and
mix the pressurized hydraulic fluid with the unpressurized hydraulic fluid in the hydraulic fluid tank to reduce temperature of the pressurized hydraulic fluid.

11. The machine of claim 10, wherein the regulator is a variable regulator and is configured to be able to vary the preselected threshold pressure.

12. The machine of claim 9, further comprising a flow switch fluidly coupled to the hydraulic pump, the ladder actuator, and the hydraulic fluid tank, the flow switch configured to:
route the pressurized hydraulic fluid from the hydraulic pump to a first port of the ladder actuator to actuate the ladder in a first pattern, and
route the pressurized hydraulic fluid from a second port of the ladder actuator to the hydraulic fluid tank.

13. The machine of claim 12, wherein the flow switch is further configured to:
route the pressurized hydraulic fluid from the hydraulic pump to the second port to actuate the ladder in a second pattern, and
route the pressurized hydraulic fluid from the first port to the hydraulic fluid tank.

14. The machine of claim 9, wherein the one-way electric motor includes a thermal switch configured to cut off the power from the battery to the one-way electric motor when internal temperature of the one-way electric motor exceeds a preselected threshold temperature.

15. The machine of claim 9, wherein the hydraulic pump comprises a pump housing that includes one or more pump bosses connected to the frame for the electrical ground by one or more conductors.

16. The machine of claim 13, further comprising:
a first valve and a second valve fluidly coupled to the ladder actuator and the flow switch,
the first valve including the variable orifice, and
the second valve including an additional variable orifice configured to control the actuation speed of the ladder.

17. A method, comprising:
receiving an input from an electrical switch;
activating a one-way electric motor in response to receiving the input, the one-way electric motor having a motor housing that includes one or more motor bosses connected to an electrical ground by one or more conductors;
driving, by the one-way electric motor, a hydraulic pump;
drawing, by the hydraulic pump, hydraulic fluid from a hydraulic fluid tank, the hydraulic pump pressurizing the hydraulic fluid;
routing the pressurized hydraulic fluid from the hydraulic pump to a ladder actuator;
actuating, with the ladder actuator using the pressurized hydraulic fluid, a ladder,
wherein actuating the ladder comprises causing, by the ladder actuator, the ladder to pivot approximately 90 degrees between a raised position and a lowered position;
routing the pressurized hydraulic fluid from the ladder actuator to the hydraulic fluid tank; and
mixing the pressurized hydraulic fluid with unpressurized hydraulic fluid in the hydraulic fluid tank to reduce temperature of the pressurized hydraulic fluid.

18. The method of claim 17, further comprising:
routing, by a regulator, the pressurized hydraulic fluid from an outlet of the hydraulic pump to the hydraulic fluid tank when a pressure of the pressurized hydraulic fluid exceeds a preselected threshold pressure;
mixing the pressurized hydraulic fluid with the unpressurized hydraulic fluid in the hydraulic fluid tank to reduce temperature of the pressurized hydraulic fluid; and
adjusting a variable orifice of a valve fluidly connected to the ladder actuator, wherein adjusting the variable orifice modifies a speed of the ladder as the ladder pivots between the raised position and the lowered position.

19. The method of claim 18, wherein the regulator is a variable regulator and is configured to be able to vary the preselected threshold pressure.

20. The method of claim 17, wherein the one-way electric motor includes a thermal switch configured to cut off power from a power source to the one-way electric motor when internal temperature of the one-way electric motor exceeds a preselected threshold temperature.

* * * * *